(12) United States Patent
Cuoq

(10) Patent No.: US 8,818,590 B2
(45) Date of Patent: Aug. 26, 2014

(54) COMBINATION OF ELECTRIC ROTARY MACHINE AND ELECTRONIC CONTROL UNIT IN AUTOMOBILE

(75) Inventor: Damien Cuoq, Palaiseau (FR)

(73) Assignee: Valeo Equipements Electriques Moteur, Creteil (FR)

( * ) Notice: Subject to any disclaimer, the term of this patent is extended or adjusted under 35 U.S.C. 154(b) by 147 days.

(21) Appl. No.: 13/129,737

(22) PCT Filed: Oct. 26, 2009

(86) PCT No.: PCT/FR2009/052052
§ 371 (c)(1),
(2), (4) Date: Oct. 10, 2011

(87) PCT Pub. No.: WO2010/061083
PCT Pub. Date: Jun. 3, 2010

(65) Prior Publication Data
US 2012/0060047 A1 Mar. 8, 2012

(30) Foreign Application Priority Data
Nov. 26, 2008 (FR) ...................................... 08 58022

(51) Int. Cl.
*G06F 11/14* (2006.01)
*F02D 41/26* (2006.01)
*G06F 9/445* (2006.01)

(52) U.S. Cl.
CPC ................ *F02D 41/26* (2013.01); *G06F 8/665* (2013.01); *G06F 9/445* (2013.01)
USPC ................... 701/22; 320/4; 320/32; 320/104; 320/125; 320/132

(58) Field of Classification Search
USPC .................. 701/22; 320/4, 32, 104, 125, 132
See application file for complete search history.

(56) References Cited

U.S. PATENT DOCUMENTS

| 4,896,263 | A | 1/1990 | Brauninger et al. |
| 5,444,214 | A * | 8/1995 | Crouse et al. ................. 219/133 |
| 5,719,485 | A * | 2/1998 | Asada ............................. 322/28 |
| 5,929,609 | A * | 7/1999 | Joy et al. ......................... 322/25 |
| 6,593,713 | B2 * | 7/2003 | Morimoto et al. ............. 318/139 |
| 6,750,636 | B2 * | 6/2004 | Hocken et al. .................. 322/63 |
| 6,894,455 | B2 * | 5/2005 | Cai et al. ....................... 318/771 |
| 7,258,183 | B2 * | 8/2007 | Leonardi et al. ............. 180/65.1 |
| 7,657,366 | B2 * | 2/2010 | Guy et al. ..................... 701/112 |
| 8,106,631 | B2 * | 1/2012 | Abe ............................... 320/137 |
| 8,606,447 | B2 * | 12/2013 | Namuduri et al. ............. 701/22 |
| 2009/0058339 | A1 * | 3/2009 | Kitano ..................... 318/400.22 |
| 2013/0041540 | A1 * | 2/2013 | Niimi .............................. 701/22 |

* cited by examiner

*Primary Examiner* — Calvin Cheung
*Assistant Examiner* — Allen E Quillen
(74) *Attorney, Agent, or Firm* — Berenato & White, LLC

(57) ABSTRACT

A system including at least one electric rotary machine and an integrated control circuit and an electronic control unit, the system being embarked in an automobile. The integrated control circuit of the system includes a RAM connected to the electronic control unit via a data communication link, and the electronic control unit includes a rewritable memory. The system further includes a configuration data permanent storage of the system in the rewritable memory as well as an upload of the configuration data into the RAM during a configuration phase of the system. The system herein enables the integrated control circuit of the electric rotary machine to be standardized by virtue of the fact that the configuration data are no longer written in a read-only memory but reside in a RAM of this circuit.

9 Claims, 2 Drawing Sheets

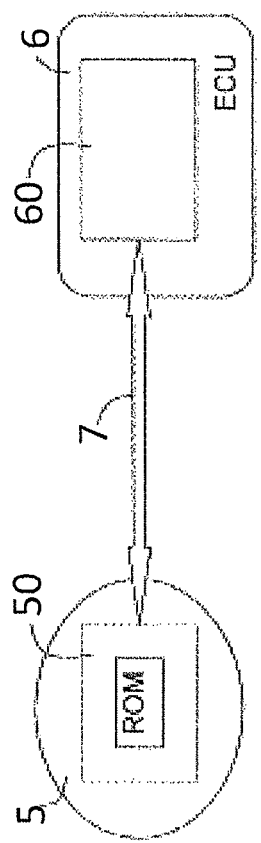
FIG. 2 - Prior Art

COMBINATION OF ELECTRIC ROTARY MACHINE AND ELECTRONIC CONTROL UNIT IN AUTOMOBILE

CROSS-REFERENCE TO RELATED APPLICATIONS AND CLAIM TO PRIORITY

This application relates to International Application No PCT/FR2009/052052 filed Oct. 26, 2009 and French patent application Ser. No. 08/58022 filed Nov. 26, 2008, of which the disclosures are incorporated herein by reference and to which priority is claimed.

FIELD OF THE INVENTION

The present invention is generally applicable in the automotive industry.

More particularly, the invention relates to a combination of a system comprising at least one electric rotary machine and an integrated control circuit and an electronic control unit, the system being installed in an automobile, the integrated control circuit of the system including a RAM connected to the electronic control unit via a data communication link, and the electronic control unit including a rewritable memory.

BACKGROUND OF THE INVENTION

As shown on FIG. 2, the integrated control circuit 50 includes a ROM read-only memory usually containing program instructions and a parameter table.

The integrated control circuit 50 is generally built around an ASIC electronic component. The external electronic control unit 6 includes a software component 60 provided to manage the electric machine 10. The external electronic control unit 6 and the integrated control circuit 50 communicate via a communication link 7. The external electronic control unit 6 transmits instructions to control the operation of the electric machine 5 via this communication link 7.

As shown on FIG. 2, the integrated control circuit 50 includes a ROM read-only memory usually containing programme instructions and a parameter table.

This traditional architecture of the prior art poses problems of flexibility and cost when developing the applications.

Thus, for example, in the case of an electric machine 5 in the form of an alternator-starter, the control strategy of the machine is executed by the integrated control circuit 50.

This control strategy depends on certain specific parameters which are programmed in tables contained in the ROM of the ASIC forming the core of the integrated control circuit 50. The parameter table is selected according to the application, the internal combustion engine of the automobile and the electric machine. This means that all parameters must be known during the production of the silicon chip of the ASIC, but it is often incompatible with planning of the development tests for defining these parameters.

Moreover, the ASIC silicon chip is specific to the application and every new application requires the production of a new silicon chip.

SUMMARY OF THE INVENTION

To avoid producing a new silicon chip version for each new application, a solution might consist of programming the parameter table in an OTP (One-Time Programming) type memory for example after the electric machine has been assembled. However, the cost of OTP memories is prohibitive beyond several bytes and such a solution is not practical.

The invention proposes a combination of a system comprising at least one electric rotary machine and an integrated control circuit and an electronic control unit, the system being installed in an automobile, the integrated control circuit of the system including a RAM connected to the electronic control unit via a data communication link, and the electronic control unit including a rewritable memory.

In accordance with the invention the combination comprises a configuration data permanent storage of the system in the rewritable memory as well as an upload of said configuration data into the RAM during a configuration phase of the system.

In addition to resolving the problems of the prior art detailed above, the combination of the invention enables the integrated control circuit of the electric rotary machine to be standardized by virtue of the fact that the configuration data are no longer written in a read-only memory but reside in a RAM of this circuit.

According to one particular embodiment, the configuration data comprise at least one parameter table and/or a control software component.

According to another feature, error detection is carried out on the configuration data uploaded into the integrated control circuit after uploading of said data.

According to yet another feature, default configuration data are used by the integrated control circuit if an error is detected.

According to yet another feature, the default configuration data are the last valid configuration data used by the integrated control circuit.

According to yet another feature, new default configuration data are uploaded into the RAM of the integrated control circuit if an error is detected.

According to another feature, an uploading period of the configuration data is masked by an anticipated command to startup the system.

According to yet other features:
the integrated control circuit is built around an ASIC;
the electric rotary machine is an alternator-starter; and
the electric rotary machine is an alternator and the integrated control circuit is a regulator of the alternator.

BRIEF DESCRIPTION OF THE DRAWINGS

Other advantages and features of this invention will appear more clearly on reading the following description of several particular embodiments with reference to the appended drawings, wherein:

FIG. 2 shows a combination of an electric rotary machine, an electronic control unit and a communication link, said combination belonging to the prior art.

DESCRIPTION OF THE PREFERRED EMBODIMENT

Figure 1:
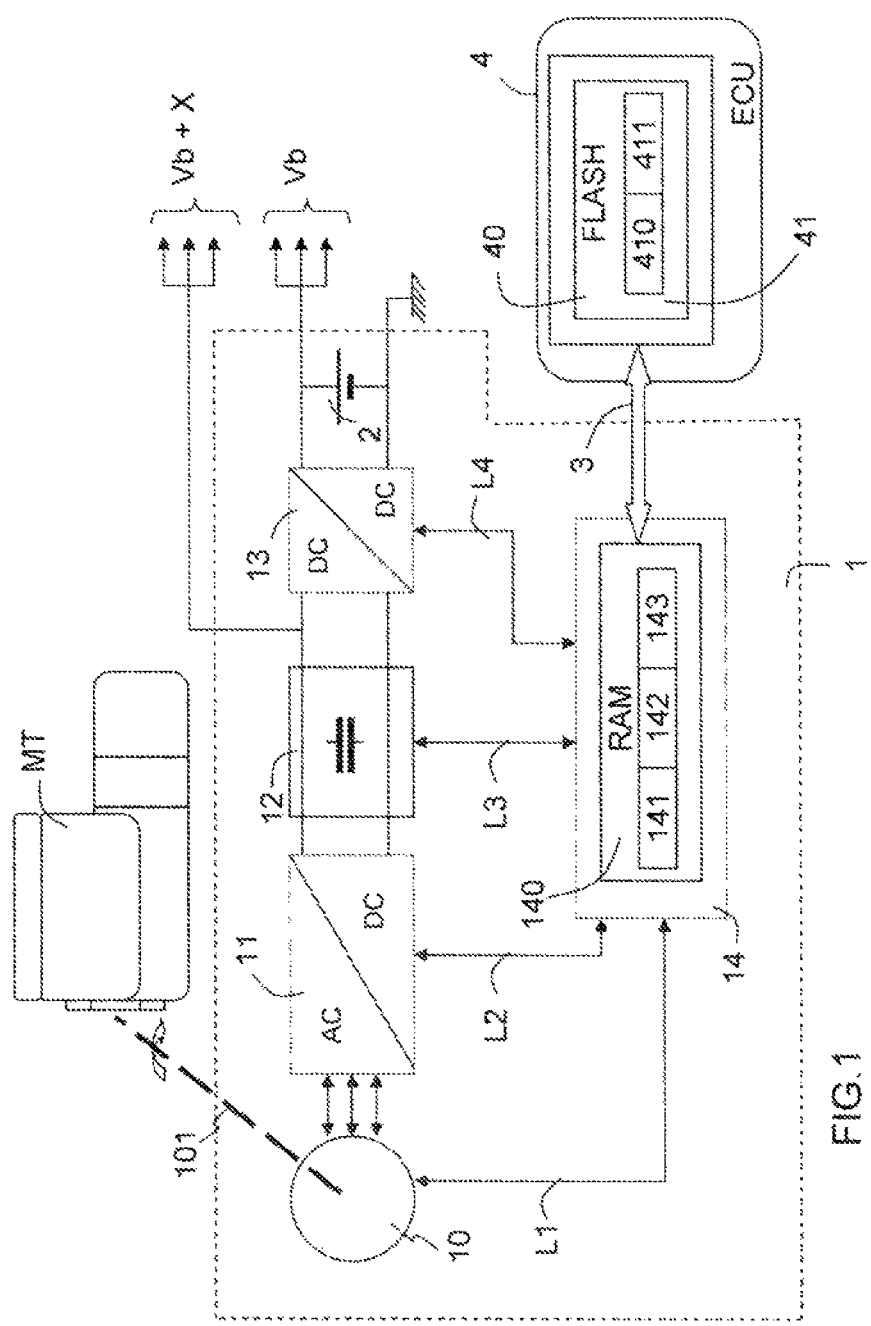
FIG. 1 is a general block diagram showing one particular embodiment of an alternator-starter system according to the invention.

As shown on FIG. 1, in this particular embodiment, the alternator-starter system 1 according to the invention primarily includes an electric rotary machine 10 in the form of an alternator-starter, a reversible AC/DC converter 11, an electrical energy storage capacitor 12, a DC/DC converter 13 and an integrated control circuit 14.

The alternator-starter system 1 is connected to a dual-voltage network onboard the automobile capable of supplying low DC voltage Vb and floating high DC voltage Vb+X.

The low DC voltage Vb is generally 12 V from a lead-acid battery 2 equipping the automobile. Preferably, the voltage Vb can be used to feed consumers in the automobile requiring a relatively stable voltage such as lighting and indicating devices.

In this particular embodiment, the DC voltage Vb+X varies for example between 12 and 60 V and is available at the terminals of the energy storage capacitor 12, the recharging voltage for which is particularly dependent on the recuperative braking operation of the electric rotary machine 10.

The voltage Vb+X can be used as a priority to feed consumers accepting variable voltage such as for example de-icing equipment. However, in certain applications, the voltage Vb+X, via a dedicated DC/DC converter (not illustrated), can also be used to feed a consumer requiring stable DC voltage, for example a car radio working on 12 V. Moreover, the voltage Vb+X in certain applications can also be used to supply voltage higher than 12 V to the electric rotary machine 10 operating in starter or driving mode.

As illustrated on FIG. 1, the electric rotary machine 10 is coupled mechanically, linkage 101, with an internal combustion engine MT of the automobile. In addition to the starter and alternator modes, in this system 1, machine 10 is also capable of operating in recuperative braking mode and torque booster mode.

In recuperative braking mode, the output voltage supplied by machine 10 is variable, typically between 16 and 60 volts in this embodiment.

In torque booster mode, machine 10 provides extra torque for traction of the automobile, in addition to that supplied by the internal combustion engine MT.

AC/DC converter 11 is a reversible device and, when the electric rotary machine 10 has to operate in driving/starter mode, enables machine 10 to be supplied with three-phase AC voltage obtained from DC voltage present at the terminals of the energy storage capacitor 12 and, when electric rotary machine 10 has to operate in alternator mode, enables the three-phase voltage supplied by machine 10 to be rectified in the form of rectified DC voltage. This rectified DC voltage recharges the energy storage capacitor 12 and, via DC/DC converter 13, battery 2.

The energy storage capacitor 12 here primarily consists of a super-capacitor pack equipped with suitable electronic circuits. For the sake of convenience, the energy storage capacitor 12 may also be called "super-capacitor pack" in the remainder of the description.

The super-capacitor pack 12, while being recharged with DC voltage supplied by AC/DC converter 11, enables electrical energy to be stored when the electric rotary machine 10 is operating in recuperative braking mode or alternator mode. The energy stored in the super-capacitor pack 12 can be restored to the voltage Vb+X network to feed various consumers and, in certain cases, to the voltage Vb network, via DC/DC converter 13, for example when machine 10 is not providing output and when battery 2 is unable to respond to peak current demand on the voltage Vb network. Moreover, the energy stored in the super-capacitor pack 12, as already indicated above, can be used for starting the internal combustion engine or for boosting the torque of the latter with voltage Vb+X which may be very substantially higher than the traditional 12 V, thus enabling the rotary machine 10 to supply considerable mechanical torque required in the case of large thermal engines.

DC/DC converter 13 is a reversible device and, on the one hand, allows transfer of energy to the voltage Vb network to feed the consumers and to recharge battery 2 and, on the other hand, transfer of energy in the opposite direction based on the 12 V voltage of battery 2 to recharge the super-capacitor pack 12 if necessary and to supply AC/DC converter 11 when the rotary machine 10 is operating in driving/starter mode.

The integrated control circuit 14 manages operation of the alternator-starter system 1 based on data representing the internal state of the alternator-starter system 1 and the state of the automobile. The integrated control circuit 14 is built around an ASIC component.

A control software module (not illustrated) is implemented in the integrated control circuit 14 so as to drive the alternator-starter system 1. State data and commands can be exchanged between the integrated control circuit 14 and various functional elements of the alternator-starter system 1 via signal exchange links. Signal exchange links L1, L2, L3 and L4 between the integrated control circuit 14 and elements 10, 11, 12 and 13 are illustrated on FIG. 1.

In accordance with the invention, in the integrated control circuit 14, the control strategy module to control the operation of system 1 calls up one or several parameter tables 141 which reside in a RAM of the integrated control circuit 14. Preferably, this RAM is that of the ASIC around which the integrated control circuit 14 is built.

The parameter tables are uploaded into the RAM 140 during an initialization phase of the alternator-starter system 1, said initialization phase beginning with the startup of system 1.

In certain applications, one or several control software components 142 of the control software module are also uploaded into the RAM, in the same way as the parameter table 141, and are executed by a processor (not illustrated) of the integrated control circuit 14.

The data formed by the parameter tables 141 and the control software components 142 are uploaded from an electronic control unit (ECU) 4, via a communication link 3.

In this embodiment, the electronic control unit 4 for example is the engine control unit of the automobile. The communication link is a connection of the LIN type, however other standards may be used, a CAN bus for example.

As also shown on FIG. 1, the electronic control unit 4 includes a control software component 40 provided for driving system 1. During the operation of system 1, data such as pressure on the brake pedal or accelerator pedal can therefore be transmitted to the alternator-starter system 1 by the electronic control unit 4 via link 3 or another data communication bus (not illustrated).

In accordance with the invention, during the initialization phase for the startup of system 1, the control software component 40 proceeds to upload the parameter tables and/or control software components into the RAM 140. In the electronic control unit 4, these parameter tables and/or control software components bear reference symbols 410 and 411 respectively.

In accordance with this embodiment, the parameter tables 410 and the control software components 411 are permanently stored in a rewritable memory 41 of the FLASH type. Advantageously, these parameter tables 410 and control software components 411 can therefore be easily modified (calibrated) during a phase to develop the application.

Tests carried out by the inventive entity show that the parameter tables 410 and control software components 411 in the form of 200 data bytes can be uploaded within 350 ms via a link 3 of the LIN type.

It will be noted here that this uploading period beginning with the startup of system 1 can be masked by an anticipated command for this startup (for example, anticipation by detecting an opening/closing sequence of the automobile door, by detecting pressure on the clutch pedal etc).

In addition, still with the aim of masking the period for uploading the configuration data, in certain applications of the invention, the system is started with the last valid configuration data and these data are later refreshed by uploading new configuration data during an inactive phase of the system, in other words at a time when the system is not in demand.

For the sake of reliability, the integrity of the uploaded data, in certain applications, can be verified by a check sum of the CRC (Cyclic Redundancy Check) type or by a software task (in the background).

Preferably, when an error following uploading is detected, uploaded data 141 and 142 can be replaced by default data 143 (FIG. 1) to put the machine in a sedentary state, possibly also swapping the control strategy of system 1.

These default data are possibly the last valid data used by the system.

In other applications, the integrated control circuit of the system, if an error is detected, may require fast uploading, for example, by means of high priority data frames such as defined in the AUTOSAR (Automotive Open System) Architecture. This enables the utilization period of the default data to be shortened.

The invention applies mainly to alternators and alternator-starter systems such as those described above with reference to FIG. 1.

In the case of an alternator, the RAM into which the data are uploaded is the RAM of an ASIC forming the core of a regulator of the alternator in the case of one application of the invention.

Another alternator-starter system in which the invention can be advantageously implemented is an alternator-starter system equipped with a stop/automatic start functionality of the internal combustion engine. In such a case, elements 12 and 13, shown on FIG. 1, are absent and the control software module includes this functionality.

The invention claimed is:

1. A combination of a alternator-starter system and of an electronic control unit separate from and electrically connected to said alternator-starter system via a data communication link, said alternator-starter system being installed in an automobile and comprising:

an alternator-starter provided for operating in a recuperative braking mode and a torque booster mode;
   an AC/DC converter;
   a DC/DC converter;
   an electrical energy storage unit electrically connected between said AC/DC converter and said DC/DC converter; and
   an integrated control circuit controlling modes of operation of said alternator-starter system based on internal state thereof and a state of said automobile;
   said integrated control circuit including a RAM connected to said electronic control unit via said data communication link;
   said electronic control unit including a rewritable memory comprising a permanent storage of configuration data of said system in said rewritable memory,
   said configuration data is uploadable into said RAM during an initialization phase of said system;
   said configuration data comprising at least one of a parameter table and a control software component;
   an uploading period of said configuration data being masked by an anticipated command to startup said system.

2. The combination according to claim 1, wherein error detection is carried out on said configuration data uploaded into said integrated control circuit, after uploading of said data.

3. The combination according to claim 2, wherein default configuration data are used by said integrated control circuit as an error is detected.

4. The combination according to claim 3, wherein said default configuration data are the last valid configuration data used by the integrated control circuit.

5. The combination according claim 2, wherein new default configuration data are uploaded into said RAM of said integrated control circuit as an error is detected.

6. The combination according to claim 1, wherein said integrated control circuit is built around an ASIC.

7. The combination according to claim 1, wherein said alternator-starter is an alternator and said integrated control circuit is a regulator of said alternator.

8. The combination according to claim 1, wherein said electronic control unit is an engine control unit of said automobile.

9. The combination according to claim 1, wherein said alternator-starter system further comprises a low DC voltage battery electrically connected to said electrical energy storage unit via said DC/DC converter.

* * * * *